United States Patent
Factor et al.

(10) Patent No.: US 6,732,108 B2
(45) Date of Patent: May 4, 2004

(54) CLASS FILE ARCHIVES WITH REDUCED DATA VOLUME

(75) Inventors: Michael Factor, Haifa (IL); Avi Teperman, Haifa (IL); Matt Greenwood, Zichron Yaacov (IL)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 09/902,732

(22) Filed: Jul. 12, 2001

(65) Prior Publication Data

US 2003/0033310 A1 Feb. 13, 2003

(51) Int. Cl.$^7$ .............................................. G06F 17/30
(52) U.S. Cl. ............................ 707/100; 707/1; 707/7; 707/10; 707/103
(58) Field of Search ................................ 707/100, 101, 707/1, 7, 102, 200, 103

(56) References Cited

U.S. PATENT DOCUMENTS 5,966,702 A  10/1999  Fresko et al.

OTHER PUBLICATIONS http://java.sun.com/ 2001.

Lindholm and Yellin, "The Java Virtual Machine", Chapter 4 and 5, Addison–Wesley, 1996.

*Primary Examiner*—Jean M. Corrielus
(74) *Attorney, Agent, or Firm*—Browdy and Neimark, P.L.L.C.

(57) ABSTRACT

A method for packaging program resources includes collecting a set of the program resources that comprises a plurality of object files, which contain data structures having entries that are constants and methods that reference the entries. The data structures in at least some of the object files are combined into a common data pool, in which semantically-identical entries in different ones of the files are represented by a single consolidated entry, irrespective of whether the entries in the different files are syntactically identical. The set of the program resources is packaged together with the common data pool in a combined output file.

72 Claims, 5 Drawing Sheets

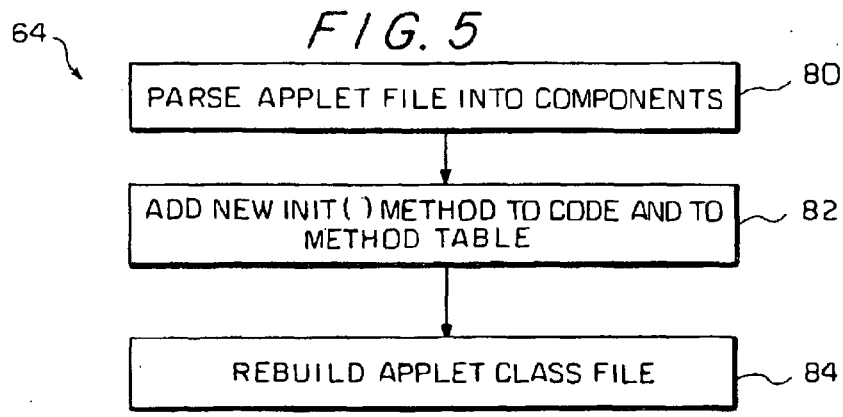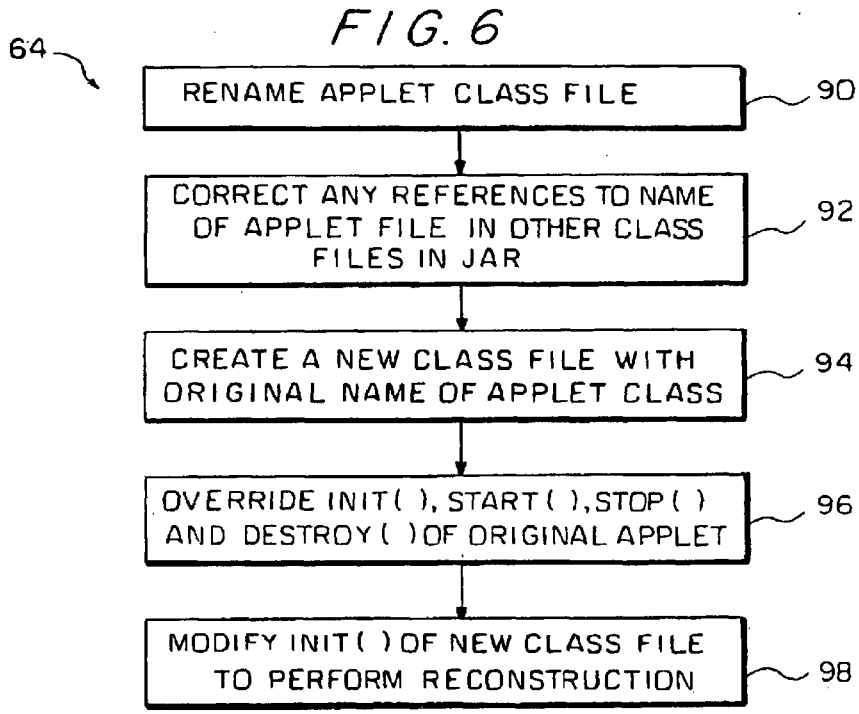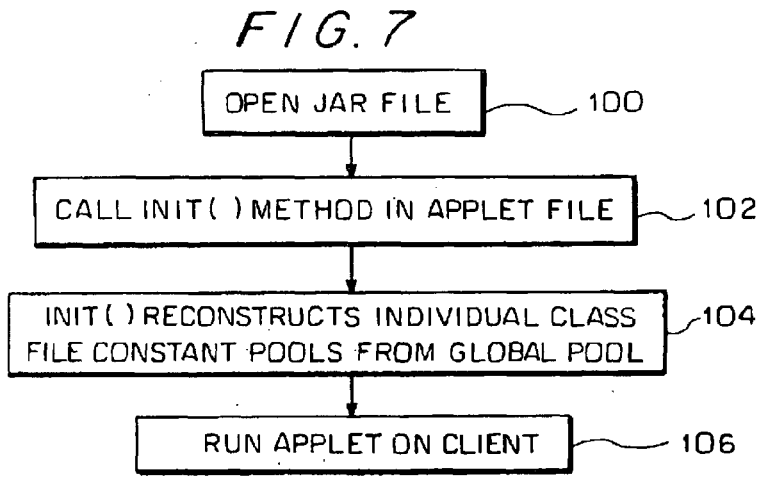

CLASS FILE ARCHIVES WITH REDUCED DATA VOLUME

FIELD OF THE INVENTION

The present invention relates generally to computer software, and specifically to object-oriented computer applications.

BACKGROUND OF THE INVENTION

In transmitting applets and applications over the Internet and other low-bandwidth networks, download time can be a crucial factor. When such software takes too long to download, the user receiving the software will at best be dissatisfied, and may abandon the matter entirely. Common applets and applications, however, typically use many class files, along with other resources, such as image and audio files. In the Web browsing environment, each file to be transferred requires its own Hypertext Transfer Protocol (HTTP) transaction. In order to reduce the time needed to download an applet or application from a server to a client, it is important both to limit the number of files transferred and the total volume of data in the files.

For Java™ applets and applications, the Java Archive (JAR) provides a platform-independent file format that aggregates many files into one and can thus be used to reduce the number of HTTP transactions required for download. Multiple applets, including both their requisite class files and other resources, can be bundled into a single JAR file. The JAR file can then be compressed in order to reduce the data volume to be downloaded. At the client end, Web browsers with Java support are able to decompress and open the JAR file and then to run the applet or application that it contains. The JAR format also supports package sealing and electronic signing of the JAR contents, using a manifest file, which is placed at the beginning of the JAR file and lists the files present in the archive. These and other aspects of the JAR format and its use are described at http://java.sun.com/products/jdk/1.2/docs/guide/jar/.

A major component in nearly any Java class file is the constant pool, which is a table containing symbolic and string information, such as variable names, method names and signatures, and field names. Almost all other data structures in the class file contain references (indices) to entries in the constant pool. In a single applet or application, composed of multiple class files, the same values typically appear in certain entries in the constant pools of many of the classes. Furthermore, many elements of the constant pools of the different classes typically have the same semantic content, such as names of methods, fields and other classes, although they may be syntactically different in the compiled byte code. In other words, entries in the constant pools belonging to different classes of the applet or application may share the same name in the class source code (common semantics), while containing different values in the byte code due to the differences in use of the named entries (differences of syntax) in the different classes. There is thus a great deal of redundancy in the contents of the constant pools. A particular example of the redundancy that normally occurs in constant pools is presented below in Tables I and II, in the Detailed Description of Preferred Embodiments.

U.S. Pat. No. 5,966,702, whose disclosure is incorporated herein by reference, describes a method for pre-processing and packaging class files that addresses the problem of syntactic redundancy among the class files. During pre-processing, each class file in a set of class files is examined to locate duplicate information in the form of redundant constants (Integer, Double, Utf8 and Long entries) contained in its constant pool. The duplicate constants are placed in a separate shared table, and all occurrences of such constants are removed from the respective constant pools of the individual class files. After removal of these shared constants, the individual class files are left with reduced constant pools. The class files and the shared table are packaged as a unit in a multi-class file, which is typically downloaded to a client (in a manner similar to the above-mentioned JAR file).

To run the set of class files at the client side, the Java Virtual Machine (JVM) must resolve constant references to determine whether to read the constant values from the shared table or from the reduced constant pools of the individual classes. A modification to the JVM is required (relative to the standard JVM that is currently used in standard Web browsers) in order to perform this sort of constant resolution. U.S. Pat. No. 5,966,702 makes no provision for reconstructing the original classes from which the multi-class file was constructed. Furthermore, although the method of this patent eliminates duplication of syntactically-identical constants, by moving them to the shared table, it makes no attempt to deal with constant pool entries that are syntactically different but semantically identical.

SUMMARY OF THE INVENTION

Preferred embodiments of the present invention provide improved methods, systems and software products for reducing the volume of data that must be transmitted in conveying a set of class files over a network. In these preferred embodiments, the constant pools of at least some of the classes—and preferably, all of the classes—are consolidated into a global constant pool. In the course of this consolidation, multiple semantically-identical entries occurring in the different constant pools of the individual classes are replaced by a single entry in the global pool. References to the constant pool entries in the different classes are accordingly replaced by references to the corresponding entry in the global constant pool. The replacement of entries and references takes place regardless of whether or not the multiple entries are syntactically identical in their individual occurrences in the different classes.

In some preferred embodiments of the present invention, the class files comprise Java classes of an applet or application, which are packaged together in a JAR file in compliance with Java standards. A mechanism is added to the JAR file to reconstruct the individual constant pools out of the global constant pool in the JAR file. This mechanism may be implemented either by appending a new class to the set in the JAR file or by modifying one of the existing classes in the file. After the JAR file has been downloaded to a client, this mechanism reconstructs the application or applet automatically, in a manner transparent to the JVM at the client side, as a first step in installing the application or running the applet.

Thus, by eliminating semantic redundancies in the constant pools, and not only syntactic duplication, preferred embodiments of the present invention generally provide greater reduction in the size of a given set of class files than do those of U.S. Pat. No. 5,966,702. Furthermore, because the different references to the entries in the individual constant pools of the various classes are replaced by multiple references to the same entry in the global constant pool, a still greater reduction in the size of the JAR file can be achieved when the JAR file is compressed. This enhanced compression is due to the fact that JAR files are conventionally compressed using "ZIP-like" (Ziv-Lempel) compression algorithms, which search for and encode multiple occurrences of identical strings found in the file. These advantages of the present invention are achieved without the need for modification of the standard JVM.

There is therefore provided, in accordance with a preferred embodiment of the present invention, a method for packaging program resources, including:

collecting a set of the program resources that includes a plurality of object files, which contain data structures having entries that are constants and methods that reference the entries;

combining the data structures in at least some of the object files into a common data pool, in which semantically-identical entries in different ones of the files are represented by a single consolidated entry, irrespective of whether the entries in the different files are syntactically identical; and packaging the set of the program resources together with the common data pool in a combined output file.

Preferably, the object files include class files, and the class files include respective constant pools containing the data structures. Most preferably, combining the data structures includes consolidating substantially all of the data structures in the constant pools of all of the object files into the common pool, and removing substantially all of the data structures from all of the object files before packaging the object files in the combined output file.

Preferably, the object files include executable code, and combining the data structures includes scanning the code to identify the entries in the different files that are semantically identical. Most preferably, scanning the code includes finding first and second ones of the entries in the different files that reference a common element in one of the files in the set, while the first and second entries themselves are different, first and second constants. Additionally or alternatively, combining the data structures includes modifying the references to the semantically-identical entries so as to refer to the consolidated entry in the common data pool.

In a preferred embodiment, packaging the set of the program resources includes adding a program mechanism to the set which, when read by a computer receiving the packaged set of program resources, causes the computer to reconstruct the data structures in the object files from the common data pool. In another preferred embodiment, packaging the set of the program resources includes compressing the resources in the output file.

There is also provided, in accordance with a preferred embodiment of the present invention, a method for generating an archive file, including:

assembling a set of program resources that include a plurality of class files containing methods and respective constant pools;

combining the constant pools of the class files into a global constant pool, in which semantically-identical entries in the constant pools of different ones of the class files are represented by a single consolidated entry, irrespective of whether the entries in the different class files are syntactically identical; and packaging the set of the program resources together with the common data pool in the archive file.

In a preferred embodiment, the class files include Java classes, and the archive file includes a Java Archive (JAR) file. Preferably, packaging the set of the program resources includes creating the JAR file in such a manner that a standard Java Virtual Machine can, substantially without modification, open the JAR file and invoke the methods in the class files that are packaged therein.

Preferably, combining the constant pools includes consolidating substantially all of the constant pools of all of the class files into the global constant pool. Further preferably, consolidating substantially all of the constant pools includes creating the global constant pool in one of the class files, and removing the constant pools from all of the other class files before packaging the class files in the archive file. In a preferred embodiment, assembling the set of program resources includes collecting the program resources needed to run an applet, and creating the global constant pool in one of the class files includes specifying the one of the class files that is first invoked among the class files in order to run the applet, and creating the global constant pool in the specified class file.

Preferably, packaging the set of the program resources includes adding a program mechanism to the set which, when read by a computer receiving the packaged set of program resources, causes the computer to reconstruct the constant pools of the class files from the global constant pool.

There is additionally provided, in accordance with a preferred embodiment of the present invention, a method for packaging program resources, including:

collecting a set of class files containing methods and constant pools, which include data structures having entries that are constants;

consolidating the constant pools of the class files into a single, common pool, including substantially all of the data structures in all of the class files in the set; and packaging the set of the class files, together with the common pool in a combined output file.

Preferably, consolidating the constant pools includes removing the constant pools from the class files after consolidating the constant pools in the common pool, most preferably by placing the common pool in one of the class files, so that the class files no longer contain the constant pools.

There is further provided, in accordance with a preferred embodiment of the present invention, a method for packaging program resources, including:

assembling a set of the program resources that includes a plurality of class files containing methods and constant pools, which include data structures having entries that are constants;

consolidating at least a portion of the constant pools of the class files into a single, common pool;

adding to the set of resources a program mechanism which, when read by a computer receiving the class files with the single, common pool, causes the computer to reconstruct the constant pools in the class files from the common pool; and packaging the set of the program resources, including the common pool and the program mechanism, in a combined output file.

In a preferred embodiment, assembling the set of program resources includes collecting the program resources needed to run an application, and adding the program mechanism includes providing the mechanism so that the computer will reconstruct the constant pools during a process of installation of the application on the computer.

In another preferred embodiment, assembling the set of program resources includes collecting the program resources needed to run an applet, and adding the program mechanism includes providing the mechanism so that the computer will reconstruct the constant pools during a process of initializing the applet. Preferably, adding the mechanism includes adding the mechanism to one of the classes that is first to be loaded by the computer when it runs the applet. Further preferably, adding the mechanism includes providing an initialization method in the class that is the first to be loaded, such that the initialization method engenders reconstruction of the constant pools. Most preferably, providing the initialization method includes adding a wrapper class containing the initialization method to the program resources needed to run the applet, and configuring the set of the program resources so that the wrapper class is the first to be loaded.

In a further preferred embodiment, the class files include Java classes, and the archive file includes a Java Archive (JAR) file. Preferably, adding the mechanism includes providing the mechanism in the JAR file in such a manner as to enable a standard Java Virtual Machine, substantially without modification, to open the JAR file and invoke the methods in the class files that are packaged therein.

There is moreover provided, in accordance with a preferred embodiment of the present invention, apparatus for packaging program resources, including an archive processor, which is arranged to collect a set of the program resources that includes a plurality of object files, which contain data structures having entries that are constants and methods that reference the entries, to combine the data structures in at least some of the object files into a common data pool, in which semantically-identical entries in different ones of the files are represented by a single consolidated entry, irrespective of whether the entries in the different files are syntactically identical, and to package the set of the program resources together with the common data pool in a combined output file.

There is furthermore provided, in accordance with a preferred embodiment of the present invention, apparatus for generating an archive file, including an archive processor, which is arranged to assemble a set of program resources that include a plurality of class files containing methods and respective constant pools, to combine the constant pools of the class files into a global constant pool, in which semantically-identical entries in the constant pools of different ones of the class files are represented by a single consolidated entry, irrespective of whether the entries in the different class files are syntactically identical, and to package the set of the program resources together with the common data pool in the archive file.

There is also provided, in accordance with a preferred embodiment of the present invention, apparatus for packaging program resources, including an archive processor, which is arranged to assemble a set of class files containing methods and constant pools, which include data structures having entries that are constants, to consolidate the constant pools of the class files into a single, common pool, including substantially all of the data structures in all of the class files in the set, and to package the set of the class files, together with the common pool in a combined output file.

There is additionally provided, in accordance with a preferred embodiment of the present invention, apparatus for packaging program resources, including an archive processor, which is arranged to assemble a set of the program resources that includes a plurality of class files containing methods and constant pools, which include data structures having entries that are constants, to consolidate at least a portion of the constant pools of the class files into a single, common pool, to add to the set of resources a program mechanism which, when read by a computer receiving the class files with the single, common pool, causes the computer to reconstruct the constant pools in the class files from the common pool, and to package the set of the program resources, including the common pool and the program mechanism, in a combined output file.

There is further provided, in accordance with a preferred embodiment of the present invention, a computer program product for packaging program resources, the product including a computer-readable medium in which program instructions are stored, which instructions, when read by a computer, cause the computer to collect a set of the program resources that includes a plurality of object files, which contain data structures having entries that are constants and methods that reference the entries, to combine the data structures in at least some of the object files into a common data pool, in which semantically-identical entries in different ones of the files are represented by a single consolidated entry, irrespective of whether the entries in the different files are syntactically identical, and to package the set of the program resources together with the common data pool in a combined output file.

There is moreover provided, in accordance with a preferred embodiment of the present invention, a computer program product for generating an archive file, the product including a computer-readable medium in which program instructions are stored, which instructions, when read by a computer, cause the computer to assemble a set of program resources that include a plurality of class files containing methods and respective constant pools, to combine the constant pools of the class files into a global constant pool, in which semantically-identical entries in the constant pools of different ones of the class files are represented by a single consolidated entry, irrespective of whether the entries in the different class files are syntactically identical, and to package the set of the program resources together with the common data pool in the archive file.

There is furthermore provided, in accordance with a preferred embodiment of the present invention, a computer program product for packaging program resources, the product including a computer-readable medium in which program instructions are stored, which instructions, when read by a computer, cause the computer to assemble a set of class files containing methods and constant pools, which include data structures having entries that are constants, to consolidate the constant pools of the class files into a single, common pool, including substantially all of the data structures in all of the class files in the set, and to package the set of the class files, together with the common pool in a combined output file.

There is also provided, in accordance with a preferred embodiment of the present invention, a computer program product for packaging program resources, the product including a computer-readable medium in which program instructions are stored, which instructions, when read by a computer, cause the computer to assemble a set of the program resources that includes a plurality of class files containing methods and constant pools, which include data structures having entries that are constants, to consolidate at least a portion of the constant pools of the class files into a single, common pool, to add to the set of resources a program mechanism which, when read by a client computer receiving the class files with the single, common pool, causes the client computer to reconstruct the constant pools in the class files from the common pool, and to package the set of the program resources, including the common pool and the program mechanism, in a combined output file.

The present invention will be more fully understood from the following detailed description of the preferred embodiments thereof, taken together with the drawings in which:

BRIEF DESCRIPTION OF THE DRAWINGS

FIG. 5 is a flow chart that schematically illustrates a method for modifying a class file archive so as to enable a client to reconstruct the class files in the archive, in accordance with a preferred embodiment of the present invention;

FIG. 6 is a flow chart that schematically illustrates a method for modifying a class file archive so as to enable a client to reconstruct the class files in the archive, in accordance with another preferred embodiment of the present invention; and FIG. 7 is a flow chart that schematically illustrates a method for running an applet that has been packaged in an archive, in accordance with a preferred embodiment of the present invention.

DETAILED DESCRIPTION OF PREFERRED EMBODIMENTS

Figure 1:
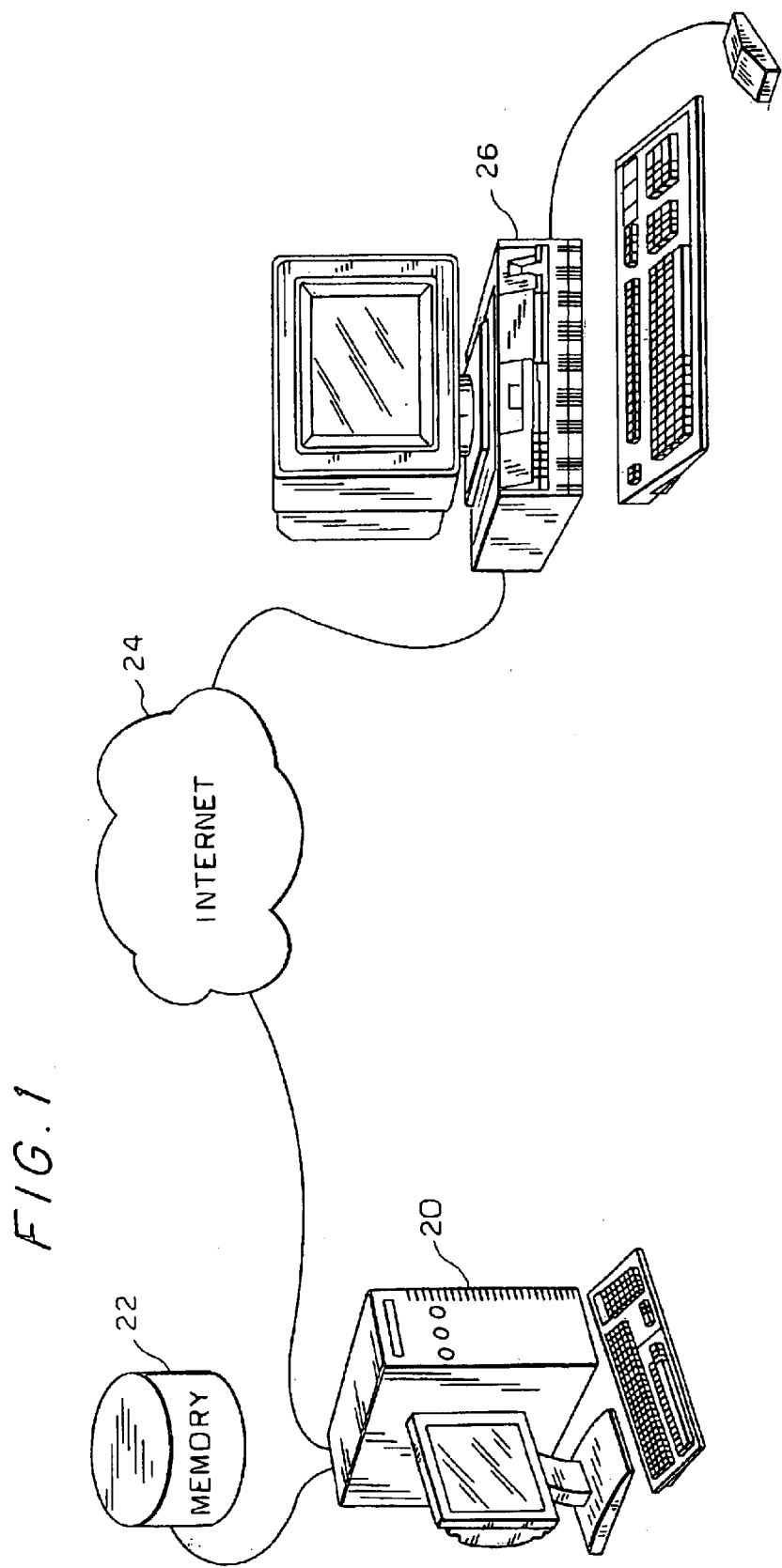
FIG. 1 is a schematic, pictorial illustration showing a system for generating and using class file archives, in accordance with a preferred embodiment of the present invention.

FIG. 1 is a schematic, pictorial illustration of a system for generating and using class file archives, in accordance with a preferred embodiment of the present invention. The archives are prepared by an archive processor 20, preferably in the form of Java Archive (JAR) files, using methods described in detail hereinbelow. The JAR files typically comprise Java class files and other resources, such as images and sound, needed for installing an application on a client computer 26, or for running an applet on the client. The JAR files are stored in a memory 22, typically a disk. In order to receive one of the JAR files, client 26 accesses processor 20 (or alternatively, another server with access to memory 22) via a network 24, such as the Internet. The client computer opens the archive and reconstructs the class files that it needs in order to install the application or run the applet, preferably using a reconstruction mechanism packaged in or with the JAR file by processor 20.

Processor 20 typically comprises a general-purpose computer, which implements an embodiment of the present invention under the control of software running on the computer. This software may be downloaded to processor 20 in electronic form, via network 24, for example, or it may alternatively be supplied to the processor on tangible media, such as CD-ROM.

Figure 2:
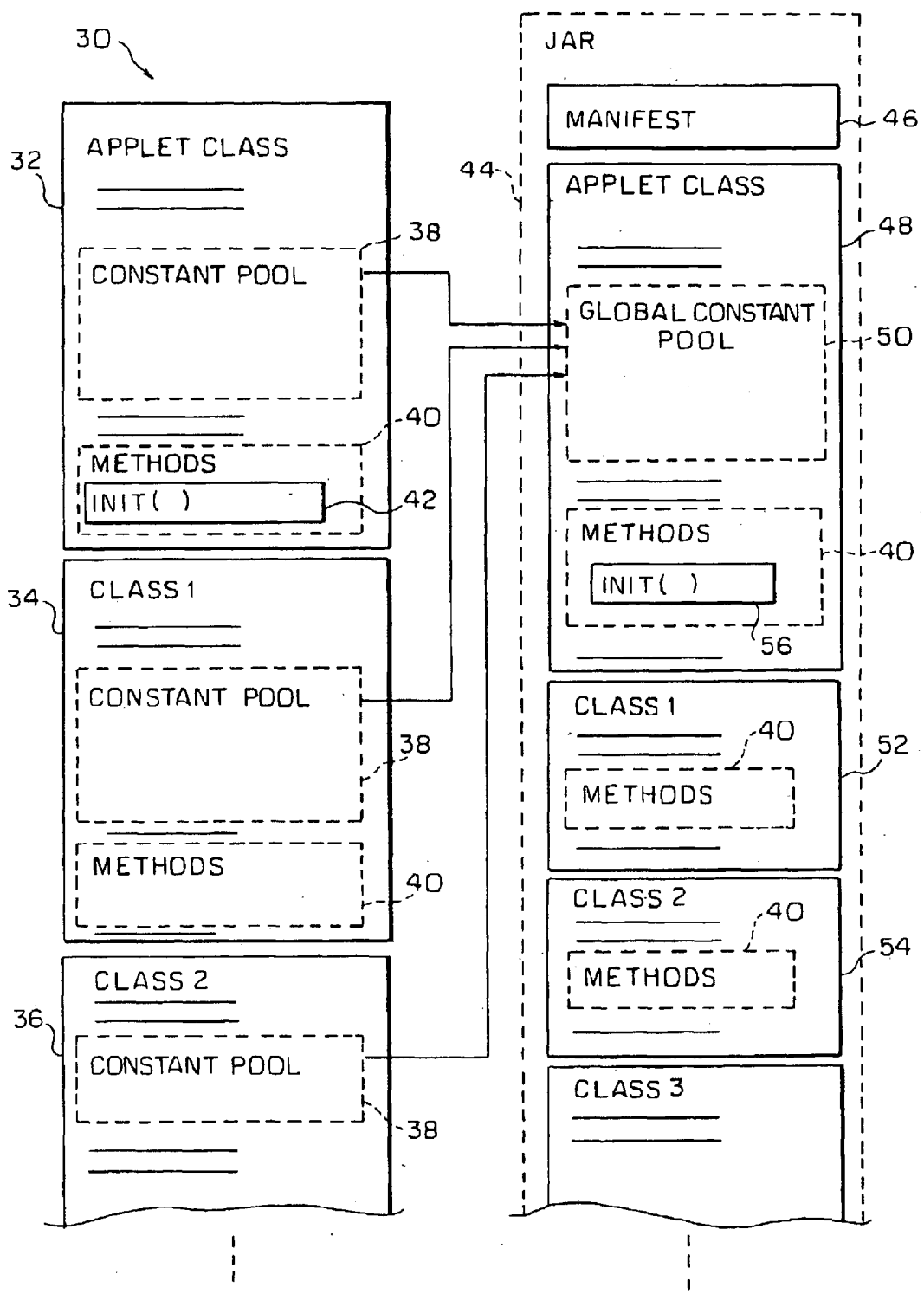
FIG. 2 is a block diagram that schematically illustrates a set of class files packaged in an archive, in accordance with a preferred embodiment of the present invention.
Figure 3:
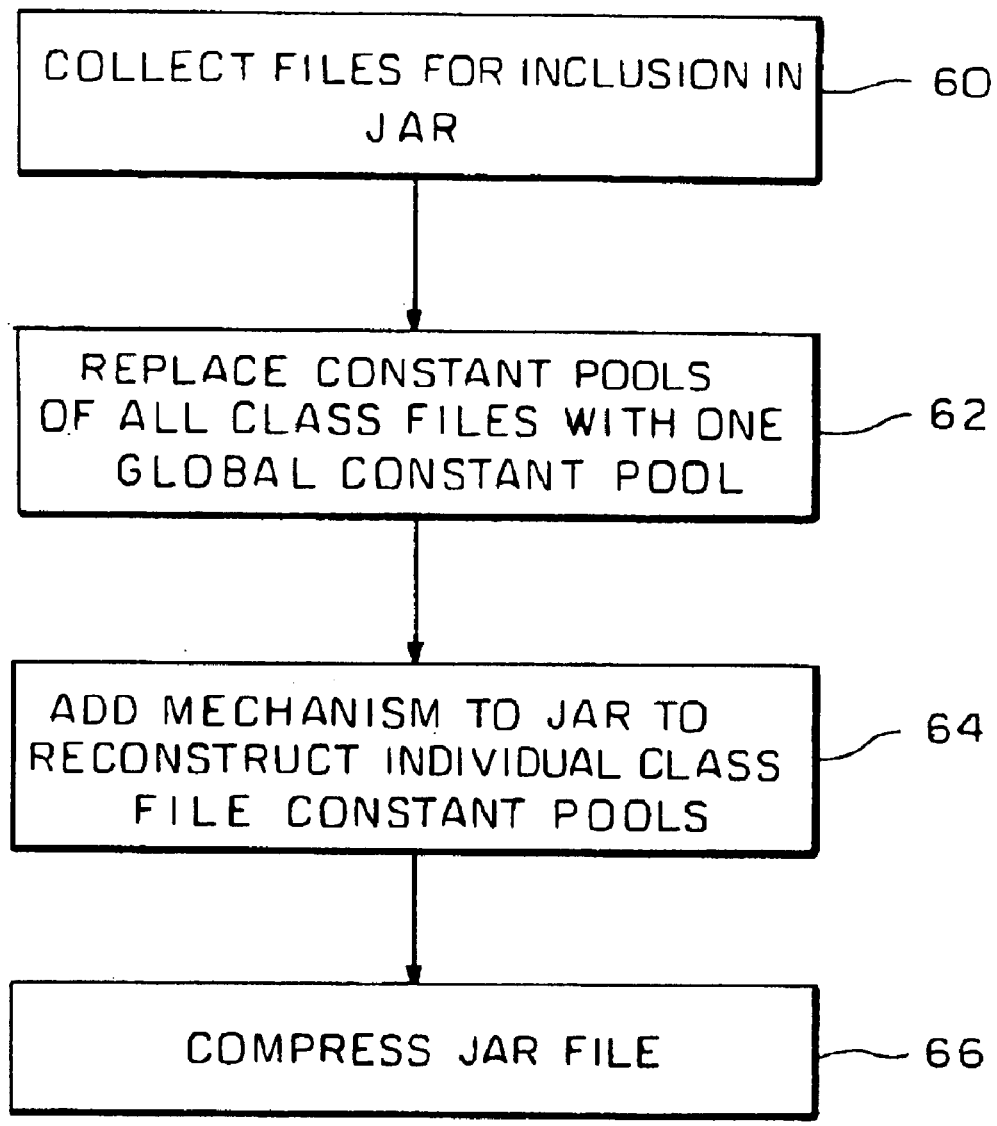
FIG. 3 is a flow chart that schematically illustrates a method for packaging a set of class files in an archive, in accordance with a preferred embodiment of the present invention.

Reference is now made to FIGS. 2 and 3, which schematically illustrate the construction of a JAR file 44, in accordance with a preferred embodiment of the present invention. FIG. 2 is a block diagram showing resources 30 and their assembly into the JAR file. FIG. 3 is a flow chart illustrating a method for constructing the JAR file. In the example of FIGS. 2 and 3, JAR file 44 contains the resources needed for a certain Java applet to be downloaded to and run by client 26. The construction of a JAR file for use in downloading a Java application and installing the application on client 26 follows generally similar lines. Thus, although for the sake of brevity, the description below generally refers only to packaging and running of Java applets, the ideas embodied in the description are for the most part applicable directly to Java applications, as well, with the exception of certain specific differences that are pointed out.

As a first step 60 in building JAR file 44, processor 20 collects a set of resources 30 to be included in the JAR file. These resources typically comprise a set of Java class files 32, 34, 36, . . . , which are required to run the applet in question on client 26. (In the description that follows, these class files are alternatively referred to simply as "classes.") A typical applet also uses non-class resources, such as image and audio files, but these other resources are omitted from FIG. 2 for clarity, since they are not material to an understanding of the present invention. Each class file contains Java byte code, generated from Java source files by a suitable compiler. The byte code comprises data structures that are arranged in a certain order, following Java language conventions. These structures include, inter alia, a constant pool 38 and a methods table 40. (Note that similar data structures in different class files are identified by the same reference numbers, although the contents of these data structures differ from file to file.) The standard Java class file structure and the constant pool are described in detail, for example, in the above-mentioned U.S. Pat. No. 5,966,702, as well in chapters 4 and 5 of The Java Virtual Machine, by Lindholm and Yellin (Addison-Wesley, 1996), which are incorporated herein by reference.

One of the classes, in the present case class 32, is the main class for the applet, also referred to hereinafter as the "applet class." This is the class whose init( ) method is invoked by client 26 in order to run the applet, typically by means of an <applet> tag naming the applet class, which appears in a Web page that is downloaded to and displayed by the client. The <applet> tag causes the Java Virtual Machine (JVM) on the client computer to invoke an init( ) method 42 in applet class 32, which initiates running of the entire applet.

In order to construct JAR file 44, processor 20 combines constant pools 38 of all of class files 32, 34, 36, . . . , into a global constant pool 50, at a pool combination step 62. Further details of this step are described hereinbelow with reference to FIG. 4. Preferably, global constant pool 50 takes the place of the individual constant pool 38 in the original applet class 32. As a result, applet class 32 in JAR file 44 is replaced by an expanded applet class 48, containing the global constant pool. Alternatively, global constant pool 50 may be contained in one of the other classes or inserted in JAR file 44 as a separate resource. In either case, classes 34, 36, . . . , are replaced in the JAR file by reduced classes 52, 54, . . . , from which the individual constant pools have been removed. References to entries in individual constant pools 38 of class files 32, 34, 36, . . . , are replaced in class files 48, 52, 54, by references to the appropriate entry in global constant pool 50. In consequence, the total data volume of class files 48, 52, 54, . . . , is substantially smaller than that of class files 32, 34, 36, . . . .

To illustrate this point, suppose that class 36 is named Baz, and contains a method DoIt, which is invoked in both class 32 and class 34. The disassembled code associated with this invocation in both of classes 32 and 34 would contain a statement such as, "invokevirtual Baz.DoIt( )". In other words, classes 32 and 34 contain semantically identical information regarding Baz.DoIt( ). In the assembled byte code, before global constant pool 50 is created, the invocation statement in each of classes 32 and 34 will contain a reference to its respective constant pool 38 in place of the method name "Baz.DoIt( )", for example, "invokevirtual #41" in class 32, and "invokevirtual #67" in class 34. (Here the syntax #nn refers to entry nn in constant pool 38.) In other words, the semantically identical method invocations in the source code of classes 32 and 34 result in syntactically different invocations in the byte code. The reason for the syntactic difference is that the entry numbers depend on the layouts of respective constant pools 38 in classes 32 and 34, which will almost always be different.

To take this example a step further, Table I below lists a number of CONSTANT data structures that would typically be used in constant pools 38 of classes 32 and 34 in connection with specifying a method, such as the above-mentioned Baz.DoIt. Table II lists entries that might actually appear in these data structures following compilation of the classes:

TABLE I

CONSTANT POOL DATA STRUCTURES

```
CONSTANT_Methodref_info {
    u1 tag;
    u2 class_index;
    u2 name_and_type_index;
}
CONSTANT_Class_info {
    u1 tag;
    u2 name_index;
}
CONSTANT_NameAndType_info {
    u1 tag;
    u2 name_index;
    u2 descriptor_index;
}
CONSTANT_Utf8_info {
    u1 tag;
    u2 length;
    u1 bytes[length];
}
```

TABLE II

EXEMPLARY CONSTANT POOL ENTRIES

| Class 32 | | Class 34 | |
|---|---|---|---|
| Entry # | Contents | Entry # | Contents |
| 10 (ClassRef) | #34 | 17 | Baz |
| 18 (NameAndType) | #22, #27 | 29 | DoIt |
| 22 | DoIt | 35 | ( )V |
| 27 | ( )V | 42 (NameAndType) | #29, #35 |
| 34 | Baz | 50 (ClassRef) | #17 |
| 41 (MethodRef) | #10, #18 | 66 (MethodRef) | #50, #42 |

In this example, the type entry "( )V" signifies a method signature taking no arguments and returning "void".

As is seen in the example above, just for the invocation of one simple method, constant pools 38 of classes 32 and 34 contain six different entries that are syntactically different but semantically identical. In global constant pool 50, each pair or group of such semantically-identical entries in constant pools 38 is replaced by a single pool entry. Thus, entries #41 in class 32 and #66 in class 34 are replaced by one entry in the global pool; entries #10 in class 32 and #50 in class 34 are replaced by another entry in the global pool; and so forth. The references to these entries in the method code of classes 32 and 34 are altered accordingly so that the methods in classes 48 and 52 reference the correct entries in global pool 50.

When client 26 receives JAR file 44, it is necessary that constant pools 38 in classes 32, 34, 36, . . . , be reconstructed out of global constant pool 50, so that a standard Java Virtual Machine (JVM) running on client 26 will be able to run these classes. For this purpose, at a reconstruction preparation step 64, a mechanism is preferably added to JAR file 44 to enable client 26 to reconstruct the individual constant pools of the original classes. Alternatively, the JVM may be modified to work with global constant pool 50 directly, in place of the individual class constant pools, but in this case, clients who still have earlier-generation JVM software will be unable to run the applet or application contained in the JAR file.

In the case that JAR file 44 contains resources of an application that is to be installed and run on client 26, step 64 preferably comprises adding an extra class and method in the JAR file, to be used in rebuilding constant pools 38 as part of the installation process. Most preferably, the extra class is identified in a manifest 46 of JAR file 44 as the main class of the application, using the "Main-class" tag specified in the standard manifest file format described in the Background of the Invention. The methods in this main class are run only once, when JAR file 44 is first opened on client 26, in order to reconstruct the constant pools and install the application on the client. Upon completion of the installation, these methods cause a new main class to be named, which is then invoked whenever the client runs the application. Alternatively, the reconstruction mechanism may be added as part of an executable file, external to JAR file 44, which is used to install the application on client 26.

When JAR file 44 contains resources of an applet requested by client 26, the applet runs on client 26 immediately after the JAR file has been downloaded, and there is no separate installation phase that can be used for reconstruction of constant pools 38. By definition of standard Java operating procedures, an init( ) method 56 of applet class 48 is invoked by the JVM on client 26 immediately after the applet is loaded and before it is started. (As noted above, the term "applet class" refers to the specific class file that is named by the client in requesting and invoking the applet.) Therefore, at step 64, the init( ) method is preferably either replaced or modified so as to be able to reconstruct original class files 32, 34, 36, . . . , before the applet itself begins to run on client 26. The reconstructed classes are placed in the appropriate /ext directory on client 26, so that normal class loading can take place. The major element in this reconstruction is rebuilding constant pools 38 from the data in global pool 50. Step 64 may be carried out in a variety of different ways, some of which are described in detail hereinbelow with reference to FIGS. 5 and 6.

After the creation of JAR file 44 is complete, the JAR file is preferably compressed to reduce its data volume still further, at a compression step 66. Compression and decompression of JAR files using a ZIP-type algorithm is supported as a part of the standard JAR file format. Algorithms of this type search the file that is to be compressed for identical strings of maximal length, and encode all occurrences of such a string using a much shorter dictionary entry or reference to an earlier occurrence of the string. Referring back to the example given above in Table I, "invokevirtual #67" in class 34 will have been replaced in the corresponding modified class 52 in JAR file 44 by the statement "invokevirtual #41", referring to entry #41 in global constant pool 50 instead of entry #67 in individual constant pool 38 of class 34. The same statement (invokevirtual #41) appears in class 48 of the JAR file. It will then be possible to encode the two (or more) occurrences of "invokevirtual #41" in the JAR file as identical strings. Since there are likely to be many duplications of this sort, it is expected that a higher ratio of compression of the JAR file will be achieved following the combination of the constant pools in step 62 than would otherwise be possible.

Figure 4:
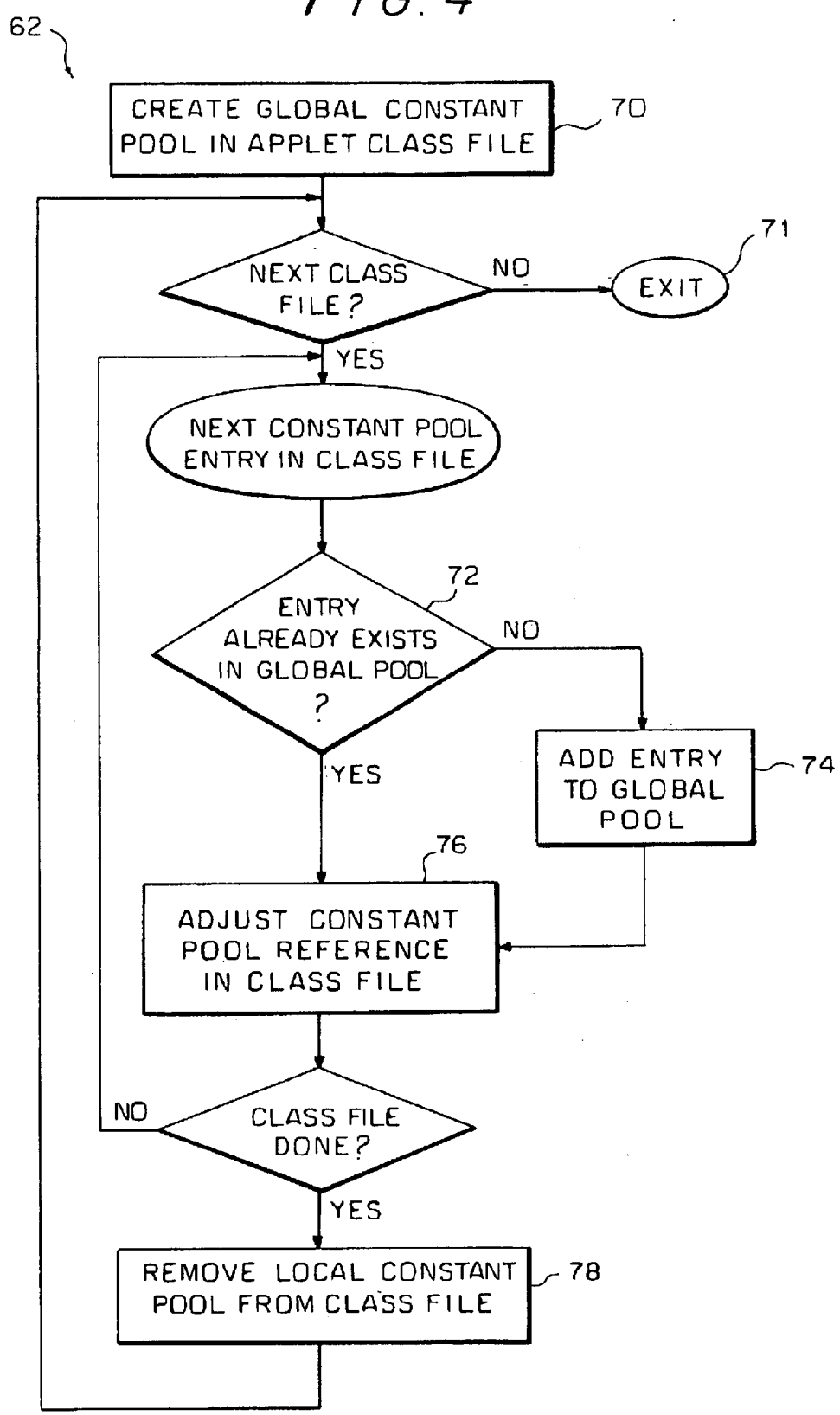
FIG. 4 is a flow chart that schematically illustrates a method for combining the individual constant pools of a set of class files into a global constant pool, in accordance with a preferred embodiment of the present invention.

FIG. 4 is a flow chart that schematically shows details of pool combination step 62, in accordance with a preferred embodiment of the present invention. At a global pool creation step 70, processor 20 parses applet class 32 to identify its components, and particularly to analyze its constant pool 38, method table 40, and references to the constant pool in the code of the methods. Global constant pool 50 is preferably initialized by assigning constant pool 38 of applet class 32 to be the global constant pool in expanded applet class 48. An advantage of this approach is that when the applet is downloaded to client 26, and init( ) method 56 of class 48 is invoked, class 48 will be recognized as containing an operational constant pool, in compliance with Java standards, even before original constant pools 38 have been reconstructed. For applications (as opposed to applets), this advantage is less important.

Processor 20 parses remaining classes 34, 36, . . . , and considers each of the entries in constant pools 38 of these classes in turn. The entries are compared to those already in global constant pool 50 in order to determine whether they are semantically identical to any of the entries already in the pool, at an entry examination step 72. Thus, referring to the example in Table I, entry #17 in class 34 (containing the class reference "Baz") would be found to be semantically identical to entry #34 in class 32. In this case, any references to the entry in question in class 34 are replaced by references to the corresponding entry in global pool 50, at a reference adjustment step 76. When there is no semantic equivalent in the constant pool for a given entry, however, the entry is added to global pool 50, at an entry addition step 74. In this case, too, the references to the entry must be replaced by appropriate references to the entry in global pool 50 at step 76. The byte code of class 34 is scanned for repeat occurrences of any references that have been adjusted, and these references are replaced, as well. After all of the references in class 34 have been replaced, constant pool 38 is removed from the class, at a local pool removal step 78.

This process preferably continues until all of the contents of constant pools 38 for all of the classes in JAR file 44 have been transferred to the global constant pool. The process then terminates, at an exit step 71. A constant pool count field in expanded applet class 48 is preferably adjusted to accord with the size of the global constant pool. The remaining, modified class files 52, 54, . . . , are preferably collected in a resource portion of the JAR file, along with other resources used by the applet.

FIG. 5 is a flow chart that schematically shows details of reconstruction preparation step 64, in accordance with a preferred embodiment of the present invention. In this embodiment, the code of applet class 32 is further modified in generating expanded applet class 48, so that the new applet class includes the methods necessary to reconstruct original constant pools 38 when the applet is loaded. In preparation for this modification, processor 20 parses class 32, at a parsing step 80, in order to identify init( ) method 42 and other components of the class that are to be modified. A similar parsing operation was described above with reference to step 70 in the method of FIG. 4, and these two parsing operations are preferably performed together.

In order to carry out the constant pool reconstruction, init( ) method 42 is modified or replaced with new init( ) method 56 for inclusion in expanded applet class 48. In one embodiment of the present invention, a new method is created in applet class 48 for reconstructing constant pools 38. The new method is assigned a unique name, not appearing in applet class 32, and init( ) method 42 is modified by inserting a call to the new method at the beginning of the init( ) method. In an alternative embodiment, code is added to the init( ) method itself for reconstructing constant pools 38, as well as for loading the reconstructed classes. The class loading step is preferably performed using the defineClass method provided in the standard Java ClassLoader class. For this purpose, the supplier of JAR file 44 must insure that ClassLoader has the permissions necessary to rebuild original classes 32, 34, 36, . . . , on client 26, such as permission to use the client's local memory for reconstruction of the constant pools.

After modifying the init( ) method and adding other methods as needed to original applet class 32, processor 20 rebuilds the class to create expanded applet class 48, at a rebuilding step 84. This step of rebuilding includes adjusting table sizes, code sizes, etc., so that class 48 meets Java standards. JAR file 44 can then be completed and prepared to send to the client. If security mechanisms provided by the manifest of the JAR file are to be used, the supplier of the applet or JAR file signs the manifest at this stage. The security mechanisms will then continue to function at the client side as specified by Java standards, with no need for modification in the way these mechanisms are handled by client 26.

FIG. 6 is a flow chart that schematically shows details of reconstruction preparation step 64, in accordance with another preferred embodiment of the present invention. In this embodiment (which is not represented by FIG. 2), original applet class 32 is "wrapped" by a new applet class. This new "wrapper" class is the one that is loaded first when client 26 attempts to run the applet. For this purpose, applet class 32 is preferably renamed, at a renaming step 90. As a result, any references to the applet class in other class files 34, 36, . . . , must be changed to refer to the new name of the class, at a reference correction step 92. Since all of the class files in JAR 44 are on hand and are, in any case, parsed for the purpose of building global constant pool 50, it is a straightforward matter to find and modify the references to the applet class.

After renaming the original applet class, the new wrapper class is created to wrap the applet class, at a new class creation step 94. The wrapper class is created by inheritance from the original applet class and is preferably given the original name of the applet class, as well. Alternatively, steps 90 and 92 may be skipped, and the wrapper class may be created with a different name. In this latter case, when the browser program on client 26 requests the applet (typically by submitting a HTTP request invoking the name of the applet class), the browser is preferably redirected to invoke the name of the wrapper class instead. Alternatively, the <applet> tag on the Web page in question may be altered to refer to the wrapper name. Further alternatively, the "Main-class" tag in the manifest of the Jar file may be used to point to the wrapper file as the main file of the applet, in which case no redirection or renaming is required.

To complete the "wrapping," the init( ), start( ), stop( ) and destroy( ) methods of the original applet class are overridden, at an overriding step 96, so that these methods call the corresponding methods in the wrapper class. The init( ) method in the wrapper class is modified to carry out the reconstruction of constant pools 38 on client 26, as described above, at a method modification step 98. The JAR file can then be completed and sent to the client.

FIG. 7 is a flow chart that schematically illustrates a method for running the applet that is packaged in JAR file 44, in accordance with a preferred embodiment of the present invention. After the JAR file has been downloaded to client 26 over network 24, the first step taken by the client is typically to decompress and open the JAR file, at an opening step 100. If manifest 46 is present in the JAR file, the client preferably reads the manifest to find the main class of the applet, and loads the main class. Otherwise, the client simply continues by loading the applet class file (or its wrapper, as noted above).

The client invokes modified init( ) method 56 in applet class file 48 or in the wrapper file, at an initialization step 102. As described above, init( ) method 56 has been modified to reconstruct constant pools 38 of individual classes 32, 34, 36, . . . , out of global pool 50, at a reconstruction step 104. The references appearing in the individual classes to the entries in constant pool 50 are likewise adjusted, in order to undo the consolidation of the constant pools that took place in step 62 (FIG. 3). The reconstructed class files are then placed in the appropriate /ext directory on client 26. The init( ) method completes its reconstruction of the original class files, following which the JVM on client 26 loads the necessary classes and runs the applet, at an applet running step 106.

Although preferred embodiments are described herein with reference to Java language conventions, and are specifically based on the JAR file format provided by Java, the principles of the present invention may similarly be applied to other languages and techniques for object-oriented programming. Therefore, although these preferred embodiments are described using certain conventional Java terminology, this terminology should be understood in a broad sense to comprehend similar elements used in other programming languages, even when these elements are referred to by different names, as is often the case. In particular, in the context of the present patent application and in the claims, the term "class files" should be taken to refer generally to object files containing methods and data; and the "constant pool" in these class files can be generalized to refer to substantially any data structures in these object files containing entries that are constants or references to other entries. An "archive" should be understood to refer to substantially any collection of resources that includes object files packaged for unified storage and/or download.

It will therefore be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for packaging program resources, comprising:

collecting a set of the program resources that comprises a plurality of object files, which contain data structures having entries that are constants and methods that reference the entries;

combining the data structures in at least some of the object files into a common data pool, in which semantically-identical entries in different ones of the files are represented by a single consolidated entry, irrespective of whether the entries in the different files are syntactically identical; and packaging the set of the program resources together with the common data pool in a combined output file.

2. A method according to claim 1, wherein the object files comprise class files, and wherein the class files comprise respective constant pools containing the data structures.

3. A method according to claim 2, wherein combining the data structures comprises consolidating substantially all of the data structures in the constant pools of all of the object files into the common pool, and removing substantially all of the data structures from all of the object files before packaging the object files in the combined output file.

4. A method according to claim 1, wherein the object files comprise executable code, and wherein combining the data structures comprises scanning the code to identify the entries in the different files that are semantically identical.

5. A method according to claim 4, wherein scanning the code comprises finding first and second ones of the entries in the different files that reference a common element in one of the files in the set, while the first and second entries themselves are different, first and second constants.

6. A method according to claim 1, wherein combining the data structures comprises modifying the references to the semantically-identical entries so as to refer to the consolidated entry in the common data pool.

7. A method according to claim 1, wherein packaging the set of the program resources comprises adding a program mechanism to the set which, when read by a computer receiving the packaged set of program resources, causes the computer to reconstruct the data structures in the object files from the common data pool.

8. A method according to claim 1, wherein packaging the set of the program resources comprises compressing the resources in the output file.

9. A method for generating an archive file, comprising:

assembling a set of program resources that comprise a plurality of class files containing methods and respective constant pools;

combining the constant pools of the class files into a global constant pool, in which semantically-identical entries in the constant pools of different ones of the class files are represented by a single consolidated entry, irrespective of whether the entries in the different class files are syntactically identical; and packaging the set of the program resources together with the common data pool in the archive file.

10. A method according to claim 9, wherein the class files comprise Java classes, and wherein the archive file comprises a Java Archive (JAR) file.

11. A method according to claim 10, wherein packaging the set of the program resources comprises creating the JAR file in such a manner that a standard Java Virtual Machine can, substantially without modification, open the JAR file and invoke the methods in the class files that are packaged therein.

12. A method according to claim 9, wherein combining the constant pools comprises consolidating substantially all of the constant pools of all of the class files into the global constant pool.

13. A method according to claim 12, wherein consolidating substantially all of the constant pools comprises creating the global constant pool in one of the class files, and removing the constant pools from all of the other class files before packaging the class files in the archive file.

14. A method according to claim 13, wherein assembling the set of program resources comprises collecting the program resources needed to run an applet, and wherein creating the global constant pool in one of the class files comprises specifying the one of the class files that is first invoked among the class files in order to run the applet, and creating the global constant pool in the specified class file.

15. A method according to claim 9, wherein the class files comprise byte code, and wherein combining the constant pools comprises scanning the byte code to identify the entries in the constant pools of the different files that are semantically identical.

16. A method according to claim 9, wherein packaging the set of the program resources comprises adding a program mechanism to the set which, when read by a computer receiving the packaged set of program resources, causes the computer to reconstruct the constant pools of the class files from the global constant pool.

17. A method according to claim 9, and comprising compressing the archive file.

18. A method for packaging program resources, comprising:
    assembling a set of the program resources that comprises a plurality of class files containing methods and constant pools, which comprise data structures having entries that are constants;
    consolidating at least a portion of the constant pools of the class files into a single, common pool;
    adding to the set of resources a program mechanism which, when read by a computer receiving the class files with the single, common pool, causes the computer to reconstruct the constant pools in the class files from the common pool; and
    packaging the set of the program resources, including the common pool and the program mechanism, in a combined output file,
    wherein assembling the set of program resources comprises collecting the program resources needed to run an application, and wherein adding the program mechanism comprises providing the mechanism so that the computer will reconstruct the constant pools during a process of installation of the application on the computer.

19. A method for packaging program resources, comprising:
    assembling a set of the program resources that comprises a plurality of class files containing methods and constant pools, which comprise data structures having entries that are constants;
    consolidating at least a portion of the constant pools of the class files into a single, common pool;
    adding to the set of resources a program mechanism which, when read by a computer receiving the class files with the single, common pool, causes the computer to reconstruct the constant pools in the class files from the common pool; and
    packaging the set of the program resources, including the common pool and the program mechanism, in a combined output file,
    wherein assembling the set of program resources comprises collecting the program resources needed to run an applet, and wherein adding the program mechanism comprises providing the mechanism so that the computer will reconstruct the constant pools during a process of initializing the applet.

20. A method according to claim 19, wherein adding the mechanism comprises adding the mechanism to one of the classes that is first to be loaded by the computer when it runs the applet.

21. A method according to claim 20, wherein adding the mechanism comprises providing an initialization method in the class that is the first to be loaded, such that the initialization method engenders reconstruction of the constant pools.

22. A method according to claim 21, wherein providing the initialization method comprises adding a wrapper class containing the initialization method to the program resources needed to run the applet, and configuring the set of the program resources so that the wrapper class is the first to be loaded.

23. A method according to claim 19, wherein the class files comprise Java classes, and wherein the archive file comprises a Java Archive (JAR) file.

24. A method according to claim 23, wherein adding the mechanism comprises providing the mechanism in the JAR file in such a manner as to enable a standard Java Virtual Machine, substantially without modification, to open the JAR file and invoke the methods in the class files that are packaged therein.

25. Apparatus for packaging program resources, comprising an archive processor, which is arranged to collect a set of the program resources that comprises a plurality of object files, which contain data structures having entries that are constants and methods that reference the entries, to combine the data structures in at least some of the object files into a common data pool, in which semantically-identical entries in different ones of the files are represented by a single consolidated entry, irrespective of whether the entries in the different files are syntactically identical, and to package the set of the program resources together with the common data pool in a combined output file.

26. Apparatus according to claim 25, wherein the object files comprise class files, and wherein the class files comprise respective constant pools containing the data structures.

27. Apparatus according to claim 26, wherein the processor is arranged to consolidate substantially all of the data structures in the constant pools of all of the object files into the common pool, and to remove substantially all of the data structures from all of the object files before packaging the object files in the combined output file.

28. Apparatus according to claim 25, wherein the object files comprise executable code, and wherein the processor is arranged to scan the code so as to identify the entries in the different files that are semantically identical.

29. Apparatus according to claim 28, wherein the processor is arranged to identify semantically-identical entries by finding first and second ones of the entries in the different files that reference a common element in one of the files in the set, while the first and second entries themselves are different, first and second constants.

30. Apparatus according to claim 25, wherein the processor is arranged to modify the references to the semantically-identical entries so as to refer to the consolidated entry in the common data pool.

31. Apparatus according to claim 25, wherein the processor is arranged to add a program mechanism to the set which, when read by a computer receiving the packaged set of program resources, causes the computer to reconstruct the data structures in the object files from the common data pool.

32. Apparatus according to claim 25, wherein the processor is arranged to compress the resources in the output file.

33. Apparatus for generating an archive file, comprising an archive processor, which is arranged to assemble a set of program resources that comprise a plurality of class files containing methods and respective constant pools, to combine the constant pools of the class files into a global constant pool, in which semantically-identical entries in the constant pools of different ones of the class files are represented by a single consolidated entry, irrespective of whether the entries in the different class files are syntactically identical, and to package the set of the program resources together with the common data pool in the archive file.

34. Apparatus according to claim 33, wherein the class files comprise Java classes, and wherein the archive file comprises a Java Archive (JAR) file.

35. Apparatus according to claim 34, wherein the processor is arranged to create the JAR file in such a manner that a standard Java Virtual Machine can, substantially without modification, open the JAR file and invoke the methods in the class files that are packaged therein.

36. Apparatus according to claim 33, wherein the processor is arranged to consolidate substantially all of the constant pools of all of the class files into the global constant pool.

37. Apparatus according to claim 36, wherein the processor is arranged to create the global constant pool in one of the class files, and to remove the constant pools from all of the other class files before packaging the class files in the archive file.

38. Apparatus according to claim 37, wherein the set of program resources comprises the program resources needed to run an applet, and wherein the processor is arranged to create the global constant pool in the one of the class files that is first invoked among the class files in order to run the applet.

39. Apparatus according to claim 33, wherein the class files comprise byte code, and wherein the processor is arranged to scan the byte code to identify the entries in the constant pools of the different files that are semantically identical.

40. Apparatus according to claim 33, wherein the processor is arranged to add a program mechanism to the set which, when read by a computer receiving the packaged set of program resources, causes the computer to reconstruct the constant pools of the class files from the global constant pool.

41. Apparatus according to claim 33, wherein the processor is arranged to compress the archive file.

42. Apparatus for packaging program resources, comprising an archive processor, which is arranged to assemble a set of the program resources that comprises a plurality of class files containing methods and constant pools, which comprise data structures having entries that are constants, to consolidate at least a portion of the constant pools of the class files into a single, common pool, to add to the set of resources of program mechanism which, when read by a computer receiving the class files with the single, common pool, causes the computer to reconstruct the constant pools in the class files from the common pool, and to package the set of the program resources, including the common pool and the program mechanism, in a combined output file, wherein the set of program resources comprises the program resources needed to run an application, and wherein the processor is arranged to provide the mechanism so that the computer will reconstruct the constant pools during a process of installation of the application on the computer.

43. Apparatus for packaging program resources, comprising an archive processor, which is arranged to assemble a set of the program resources that comprises a plurality of class files containing methods and constant pools, which comprise data structures having entries that are constants, to consolidate at least a portion of the constant pools of the class files into a single, common pool, to add to the set of resources of program mechanism which, when read by a computer receiving the class files with the single, common pool, causes the computer to reconstruct the constant pools in the class files from the common pool, and to package the set of the program resources, including the common pool and the program mechanism, in a combined output file, wherein the set of program resources comprises the program resources needed to run an applet, and wherein the processor is arranged to provide the mechanism so that the computer will reconstruct the constant pools during a process of running the applet.

44. Apparatus according to claim 43, wherein the processor is arranged to add the mechanism to one of the classes that is first to be loaded by the computer when it runs the applet.

45. Apparatus according to claim 44, wherein the mechanism comprises an initialization method in the class that is the first to be loaded, such that the initialization method engenders reconstruction of the constant pools.

46. Apparatus according to claim 45, wherein the processor is arranged to add a wrapper class containing the initialization method to the program resources needed to run the applet, and to configure the set of the program resources so that the wrapper class is the first to be loaded.

47. Apparatus according to claim 43, wherein the class files comprise Java classes, and wherein the archive file comprises a Java Archive (JAR) file.

48. Apparatus according to claim 47, wherein the mechanism is provided in the JAR file in such a manner as to enable a standard Java Virtual Machine, substantially without modification, to open the JAR file and invoke the methods in the class files that are packaged therein.

49. A computer program product for packaging program resources, the product comprising a computer-readable medium in which program instructions are stored, which instructions, when read by a computer, cause the computer to collect a set of the program resources that comprises a plurality of object files, which contain data structures having entries that are constants and methods that reference the entries, to combine the data structures in at least some of the object files into a common data pool, in which semantically-identical entries in different ones of the files are represented by a single consolidated entry, irrespective of whether the entries in the different files are syntactically-identical, and to package the set of the program resources together with the common data pool in a combined output file.

50. A product according to claim 49, wherein the object files comprise class files, and wherein the class files comprise respective constant pools containing the data structures.

51. A product according to claim 50, wherein the instructions cause the computer to consolidate substantially all of the data structures in the constant pools of all of the object files into the common pool, and to remove substantially all of the data structures from all of the object files before packaging the object files in the combined output file.

52. A product according to claim 49, wherein the object files comprise executable code, and wherein the instructions cause the computer to scan the code so as to identify the entries in the different files that are semantically identical.

53. A product according to claim 52, wherein the instructions cause the computer to identify semantically-identical entries by finding first and second ones of the entries in the different files that reference a common element in one of the files in the set, while the first and second entries themselves are different, first and second constants.

54. A product according to claim 49, wherein the instructions cause the computer to modify the references to the semantically-identical entries so as to refer to the consolidated entry in the common data pool.

55. A product according to claim 49, wherein the instructions cause the computer to add a program mechanism to the set which, when read by a client computer receiving the packaged set of program resources, causes the client computer to reconstruct the data structures in the object files from the common data pool.

56. A product according to claim 49, wherein the instructions cause the computer to compress the resources in the output file.

57. A computer program product for generating an archive file, the product comprising a computer-readable medium in which program instructions are stored, which instructions, when read by a computer, cause the computer to assemble a set of program resources that comprise a plurality of class files containing methods and respective constant pools, to combine the constant pools of the class files into a global constant pool, in which semantically-identical entries in the constant pools of different ones of the class files are represented by a single consolidated entry, irrespective of whether the entries in the different class files are syntactically identical, and to package the set of the program resources together with the common data pool in the archive file.

58. A product according to claim 57, wherein the class files comprise Java classes, and wherein the archive file comprises a Java Archive (JAR) file.

59. A product according to claim 58, wherein the instructions cause the computer to create the JAR file in such a manner that a standard Java Virtual Machine can, substantially without modification, open the JAR file and invoke the methods in the class files that are packaged therein.

60. A product according to claim 57, wherein the instructions cause the computer to consolidate substantially all of the constant pools of all of the class files into the global constant pool.

61. A product according to claim 60, wherein the instructions cause the computer to create the global constant pool in one of the class files, and to remove the constant pools from all of the other class files before packaging the class files in the archive file.

62. A product according to claim 61, wherein the set of program resources comprises the program resources needed to run an applet, and wherein the instructions cause the computer to create the global constant pool in the one of the class files that is first invoked among the class files in order to run the applet.

63. A product according to claim 57, wherein the class files comprise byte code, and wherein the instructions cause the computer to scan the byte code to identify the entries in the constant pools of the different files that are semantically identical.

64. A product according to claim 57, wherein the instructions cause the computer to add a program mechanism to the set which, when read by a client computer receiving the packaged set of program resources, causes the client computer to reconstruct the constant pools of the class files from the global constant pool.

65. A product according to claim 57, wherein the instructions cause the computer to compress the archive file.

66. A computer program product for packaging program resources, the product comprising a computer-readable medium in which program instructions are stored, which instructions, when read by a computer, cause the computer to assemble a set of the program resources that comprises a plurality of class files containing methods and constant pools, which comprise data structures having entries that are constants, to consolidate at least a portion of the constant pools of the class files into a single, common pool, to add to the set of resources a program mechanism which, when read by a client computer receiving the class files with the single, common pool, causes the client computer to reconstruct the constant pools in the class files from the common pool, and to package the set of program resources, including the common pool and the program mechanism, in a combined output file,
wherein the set of program resources comprises the program resources needed to run an application, and wherein the program instructions cause the computer to provide the mechanism so that the client computer will reconstruct the constant pools during a process of installation of the application on the computer.

67. A computer program product for packaging program resources, the product comprising a computer-readable medium in which program instructions are stored, which instructions, when read by a computer, cause the computer to assemble a set of the program resources that comprises a plurality of class files containing methods and constant pools, which comprise data structures having entries that are constants, to consolidate at least a portion of the constant pools of the class files into a single, common pool, to add to the set of resources a program mechanism which, when read by a client computer receiving the class files with the single, common pool, causes the client computer to reconstruct the constant pools in the class files from the common pool, and to package the set of program resources, including the common pool and the program mechanism, in a combined output file,
wherein the set of program resources comprises the program resources needed to run an applet, and wherein the instructions cause the computer to provide the mechanism so that the client computer will reconstruct the constant pools during a process of running the applet.

68. A product according to claim 67, wherein the instructions cause the computer to add the mechanism to one of the classes that is first to be loaded by the computer when it runs the applet.

69. A product according to claim 68, wherein the mechanism comprises an initialization method in the class that is the first to be loaded, such that the initialization method engenders reconstruction of the constant pools.

70. A product according to claim 69, wherein the instructions cause the computer to add a wrapper class containing the initialization method to the program resources needed to run the applet, and to configure the set of the program resources so that the wrapper class is the first to be loaded.

71. A product according to claim 67, wherein the class files comprise Java classes, and wherein the archive file comprises a Java Archive (JAR) file.

72. A product according to claim 71, wherein the mechanism is provided in the JAR file in such a manner as to enable a standard Java Virtual Machine, substantially without modification, to open the JAR file and invoke the methods in the class files that are packaged therein.

* * * * *